United States Patent
Markusson

(10) Patent No.: US 7,455,572 B2
(45) Date of Patent: Nov. 25, 2008

(54) METHOD AND DEVICE FOR GRINDING A SAW CHAIN

(75) Inventor: Pär Markusson, Rimbo (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 10/534,152

(22) PCT Filed: Nov. 4, 2003

(86) PCT No.: PCT/SE03/01695

§ 371 (c)(1),
(2), (4) Date: Jul. 11, 2005

(87) PCT Pub. No.: WO2004/041466

PCT Pub. Date: May 21, 2004

(65) Prior Publication Data

US 2006/0009135 A1    Jan. 12, 2006

(30) Foreign Application Priority Data

Nov. 7, 2002    (SE) .................................. 0203276

(51) Int. Cl.
*B24B 1/00* (2006.01)
*B23D 63/16* (2006.01)

(52) U.S. Cl. .................. 451/45; 76/80.5; 451/160; 451/164; 451/179

(58) Field of Classification Search ............ 451/28, 451/45, 124, 150, 152, 153, 154, 160, 164, 451/179, 367; 76/37, 80.5
See application file for complete search history.

(56) References Cited

U.S. PATENT DOCUMENTS

| | | | | |
|---|---|---|---|---|
| 2,410,828 | A | * | 11/1946 | Lofstrand, Jr. ............. 76/43 |
| 2,811,874 | A | | 11/1957 | Rethoret |
| 3,020,783 | A | | 2/1962 | Hill |
| 3,071,026 | A | * | 1/1963 | De Witt .................... 76/40 |
| 3,779,103 | A | * | 12/1973 | Silvey .................... 76/80.5 |
| 4,040,313 | A | * | 8/1977 | Lustgraaf .................. 76/37 |
| 4,120,215 | A | * | 10/1978 | Kaye .................... 76/80.5 |
| 4,336,726 | A | * | 6/1982 | Silvey .................... 76/80.5 |
| 4,463,630 | A | | 8/1984 | Turner |
| 4,643,050 | A | | 2/1987 | Silvey |
| 4,679,358 | A | * | 7/1987 | Sieradzki .................. 451/6 |
| 5,031,482 | A | | 7/1991 | Shepherd |
| 5,890,401 | A | * | 4/1999 | Hensinger et al. ........... 76/41 |
| 2002/0078796 | A1 | | 6/2002 | Brown |

FOREIGN PATENT DOCUMENTS

| | | |
|---|---|---|
| DE | 803 579 | 7/1949 |
| DE | 7 224 768 | 11/1972 |
| FR | 2 586 952 | 3/1987 |

* cited by examiner

*Primary Examiner*—Timothy V Eley
(74) *Attorney, Agent, or Firm*—Pearne & Gordon LLP

(57) ABSTRACT

A method and device for grinding a saw chain (26), the saw chain (26) being clamped in a position suitable for grinding. A rotating grinding disc (11) is manually transferred from an inactive position to an active position. Grinding of a cutter link (39) of the saw chain (26) is effected when the grinding disc (11) has assumed its active position. Further, the transfer of the grinding disc (11) from the inactive position to the active position is effected by a rectilinear movement that is carried out by rolling contact.

13 Claims, 3 Drawing Sheets

METHOD AND DEVICE FOR GRINDING A SAW CHAIN

This application claims the benefit of International Application Number PCT/SE2003/001695, which was published in English on May 21, 2004.

TECHNICAL FIELD OF THE INVENTION

The present invention relates to a method for grinding a saw chain, said saw chain being clamped in a position suitable for grinding, wherein a rotating grinding disc is manually transferred from an inactive position to an active position, and wherein grinding of a cutter link of the saw chain is effected when the grinding disc has assumed its active position. The invention also relates to a device for grinding a saw chain. It should be pointed out that the present invention only relates to a method and a device where the grinding disc is manually transferred from the inactive position to the active position.

PRIOR ART

In connection with devices of the type mentioned above the suspension frame of the grinding disc is such that the centre of rotation of the grinding disc moves along a circular arc when the grinding disc moves between its inactive position and its active position. This is an evident disadvantage that affects the results of the grinding in a negative way. Since the diameter of the grinding disc decreases when the disc is worn it is realised that the engagement to the cutter link is not the same when the centre of rotation of the grinding disc moves along a circular arc.

From U.S. Pat. No. 4,643,050 a grinding device for grinding depth gauges of a saw chain is previously known. A grinding disc with an adherent motor is pivotable around an axis, i.e. the grinding disc moves along a circular arc in connection with the relative movement between the grinding disc and the depth gauge that is to be ground. In order to adjust the level of the grinding disc relative to the depth gauge that is to be ground a rectilinear, vertical displacement of the grinding disc is effected by means of a sliding means.

In the known devices for grinding it is also common that the saw chain is clamped in position manually in a separate operation before the grinding disc is brought to move from its inactive position to its active position.

OBJECTS AND FEATURES OF THE INVENTION

A primary object of the present invention is to define a method of the type mentioned above, where the grinding disc engages the cutter link in principally an identical way, regardless how much the grinding disc has been worn, the diameter of the grinding disc being decreased by the wear.

Still an object of the present invention is to automatize the clamping of the saw chain.

At least the primary object of the present invention is realised by means of a method and a device that has been given the features of the appending independent claims. Preferred embodiments of the invention are defined in the dependent claims.

BRIEF DESCRIPTION OF THE DRAWINGS

Below an embodiment of the invention will be described, reference being made to the accompanying drawings, where:

FIG. 1A shows an enlarged detail of FIG. 1.

DETAILED DESCRIPTION OF A PREFERRED EMBODIMENT OF THE INVENTION

Figure 1:
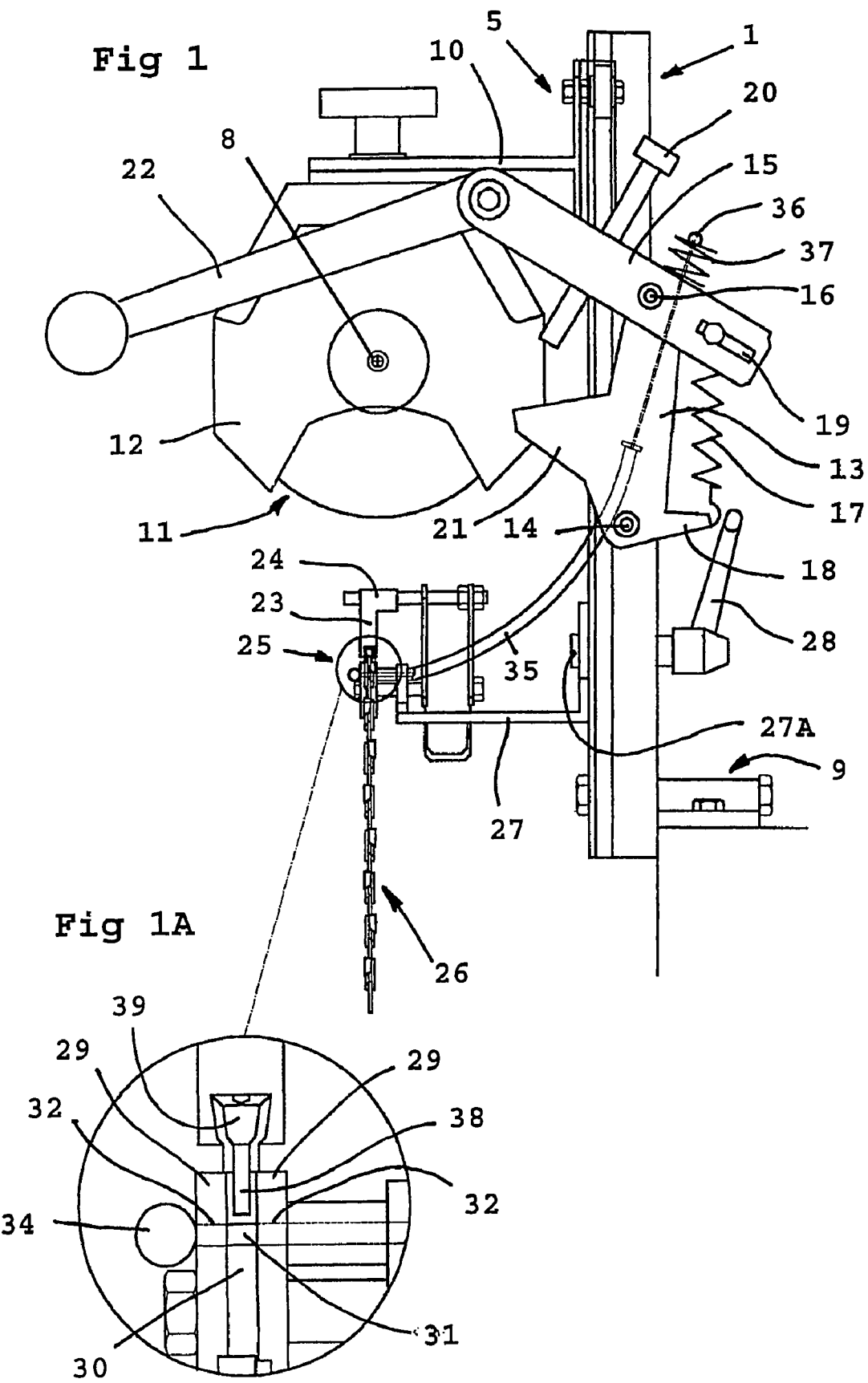
FIG. 1 shows a view of a device according to the present invention, a grinding disc being in an inactive position, said grinding disc being part of the device.
Figure 2:
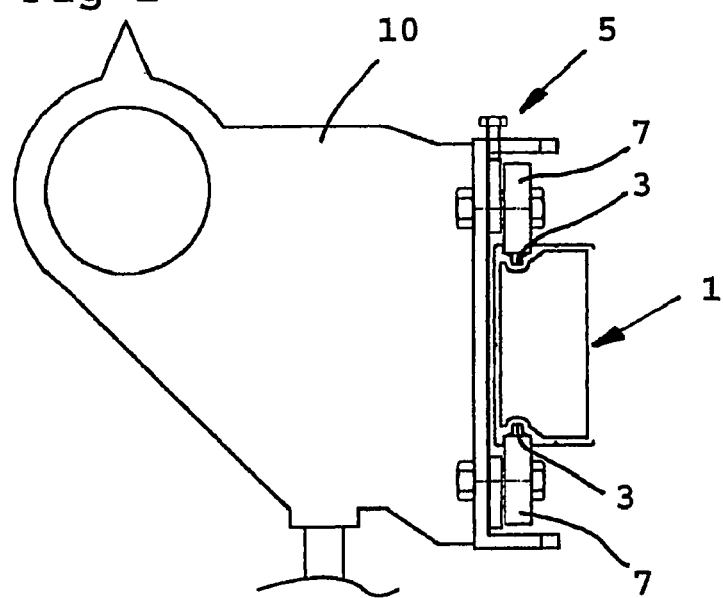
FIG. 2 shows a top view of a profile that constitutes a part of the device and the portion of the device that cooperates with the profile.
Figure 3:
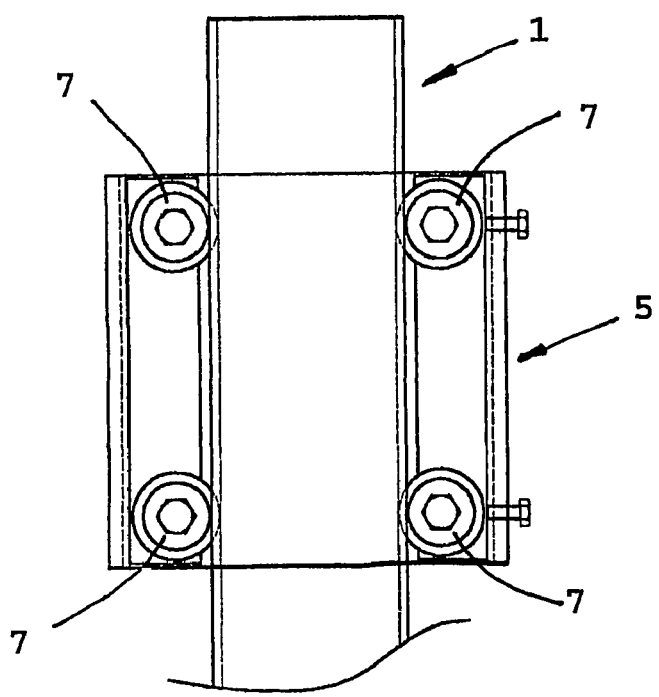
FIG. 3 shows a side view of a portion of the profile and the portion of the device that cooperates with the profile.

The device for grinding saw chains, shown in FIGS. 1-3, comprises a guiding means in the shape of an elongated guide 1 that in the shown embodiment constitutes a hollow square profile, preferably an ejection molded aluminum profile. The guide 1 has two external grooves 3, located opposite to each other. The device further comprises a carriage 5 and four ball bearings 7 that are rotatably mounted on the carriage 5 and in pairs each received in a groove 3 of the guide 1. Due to this arrangement, the carriage 5 is rectilinearly displaceable along the guide 1 in the longitudinal direction of the guide 1, the displacement being carried out with a low roll resistance due to the cooperation between the ball bearings 7 and the grooves 3.

The device according to the invention also comprises an attachment 9 that is permanently connected to the guide 1. By means of the attachment 9 the device according to the present invention may be mounted on a base, e.g. a work table or the like, said mounting preferably being effected by having the attachment fixed to the base by means of bolts or the like.

The carriage 5 has a first bracket 10 that projects sidewards from the carriage 5 and supports a grinding disc 11 of the device, said grinding disc 11 being rotated by a motor (not shown). The centre of rotation of the grinding disc 11 is designated by 8 and the grinding disc 11 is to a major part surrounded by an enclosure 12 that gives access only to a lower part of the grinding disc 11, i.e. the portion that engages a cutter link of the saw chain that is to be ground. This will be described more in detail below.

The device according to the invention also comprises a displacement mechanism that displaces the carriage 5, including the first bracket 10 and the grinding disc 11, along the guide 1. This displacement mechanism comprises a first link 13 that via a first hinge 14 is pivotally attached to the guide 1. A second link 15 of the displacement mechanism is connected to the first link 13 by means of a second hinge 16. This means that the second link 15 is pivotable relative to the first link 13. A tension spring 17 extends between a first projection 18 of the first link 13 and an elongated opening 19 of the second link 15, said opening 19 being located in the area of one end of the second link 15. The function of the tension spring 17 will be described below. An adjusting screw 20 is also attached to the second link 15, said adjusting screw 20 having an extension on both sides of the second link 15. The adjusting screw 20 may also be displaced relative to the second link 15, which means that the degree of extension on both sides of a second link 15 may be varied. The free end of the adjusting screw 20 is intended to cooperate with a second projection 21 of the first link 13.

The end of the second link 15 that faces away from the opening 19 is connected to the first bracket 10. A control arm 22 projects from this end of the second link 15, said control arm 22 extending sidewards a distance beyond the grinding disc 11 with its enclosure 12. As a result, the control arm 22 is easily accessible to the operator of the device according to the present invention. As will be described more in detail below the carriage 5 may be displaced along the guide 1 by manual actuation of the control arm 22.

The device according to the present invention also comprises a clamping means 25 for the saw chain 26 that is to be ground. The clamping means 25 comprises a second bracket 27, by which the clamping means 25 is attached to the guide 1, the second bracket 27 being pivotally mounted to the guide 1 by means of a hinge 27A. The second bracket 27 may be clamped in a fixed position relative to the guide 1 by means of a clamping arm 28. The clamping means 25 also comprises an adjustable abutment 23 that is supported by a supporting means 24 that in its turn is attached to the second bracket 27. The adjustable abutment 23 is of a conventional design that represents prior art in the present case.

The clamping means 25 is disclosed more in detail in FIG. 1A and FIG. 4A, and hence reference is primarily made to those figures in the description below of the clamping means 25. As is evident from FIG. 1A and FIG. 4A the clamping means 25 comprises two chain rulers 29 that define a variable space 30 between the upper longitudinal edges of the chain rulers 29. This may for instance be achieved by having the chain rulers 29 rigidly connected to each other in their lower parts and the resilient material, e.g. spring steel, in the chain rulers 29 renders a variable space 30 between the upper longitudinal edges of the chain rulers 29. In order to achieve a controlled variation of the space 30 between the upper longitudinal edges of the chain rulers 29 a wire 31 extends through the space 30 and also through the chain rulers 29. This means that the chain rulers 29 have holes 32 for the wire 31, said holes 32 being located directly opposite to each other. At its free end the wire 31 is equipped with a first wire nipple 34. After having passed through the chain rulers 29 the wire 31 further extends inside a wire casing 35 and the end of the wire 31 that faces away from the clamping means 25 is fastened in the second link 15, said fastening being effected by means of a second wire nipple 36 and a pressure spring 37. This is only schematically shown in FIGS. 1 and 4 but the person skilled in the art realises that there must be an abutment, e.g. in the shape of a washer, for the second wire nipple 36 and that the abutment cooperates with the pressure spring 37.

The device described above functions in the following way. FIG. 1 symbolizes an inactive position of the device according to the present invention while FIG. 4 symbolizes an active position. When a saw chain 26 is to be ground said chain 26 is mounted in the clamping means 25, see FIG. 1A, and a drive link 38 of the saw chain 26 is mounted in the space 30 between the chain rulers 29 and an adjustment is also effected of the cutter link 39 that is to be ground. In connection therewith the above described adjustable abutment 23 is used. As is evident from FIG. 1A no contact is established in this phase between the drive link 38 and the chain rulers 29. In order to effect grinding of the positioned cutter link 39 the rotation of the grinding disc 11 is started, the direction of rotation being marked by the arrow 40 in FIG. 4. Then the operator grips the control handle 22 and the operator pulls the control handle 22 downwards. In connection therewith the second link 15 will pivot around the second hinge 16 and the carriage 5 will move rectilinearly downwards along the guide 1. In connection therewith also the centre of rotation 8 of the grinding disc 11 will move rectilinear along the guide 1. This downwards directed movement is part of the working movement of the grinding disc 11, said movement also comprising a movement upwards that returns the grinding disc 11 to its inactive position. When the second link 15 is pivoted around the second hinge 16, in connection with the movement downwards of the carriage 5, the tension spring 17 will be prolonged, i.e. the tension spring 17 counteracts the movement downwards of the carriage 5. In connection with the pivoting of the second link 15 a compression of the pressure spring 37 will occur and the wire 31 will be subjected to a tensile force that is directed from the clamping means 25 towards the second link 15. In connection therewith the wire 31 will urge the chain rulers 29 to abutment against the drive link 38 of the saw chain 26, and hence the drive link 38 is clamped in position. During the continued displacement downwards of the control handle 22 via the operator, the grinding disc 11 will enter into engagement with the cutter link 39 and grinding is effected of said cutter link 39. This is indicated in FIG. 4A by a ray of sparks 41. In order to prevent that the grinding disc 11 moves too far downwards the free end of the adjusting screw 20 will abut the second projection 21, which prevents the carriage 5, with the grinding disc 11, to move further downwards. It should be pointed out that the displacement of the wire 31 that the pivoting of the second link 15 brings about is adjusted in such a way that the clamping of the drive link 38 is effected before the grinding disc 11 enters into engagement with the cutter link 39.

When the grinding of the cutter link 39 has been completed the operator releases the control handle 22 and the device according to the present invention automatically returns to an inactive position. This is achieved since both the tension spring 17 and the pressure spring 37 strive to elevate the end of the second link 15 that supports the first bracket 10. During the final phase of this return movement the force in the wire 31 will in principle cease and the engagement of the chain rulers 29 with the drive link 38 will likewise cease, i.e. the position shown in FIG. 1A will again be present. A new cutter link 39 to be ground is now fed and in the shown embodiment this is effected manually by having the operator to bring the saw chain 26 forward a certain distance that is defined by the abutment 23. Then the method described above is cyclically repeated.

To sum up, the device according to the present invention guarantees that the center of rotation of the grinding disc 11 moves rectilinear along the guide 1. This is beneficial for the engagement of the grinding disc 11 with the cutting edge of the cutter link that is to be ground.

Figure 4:
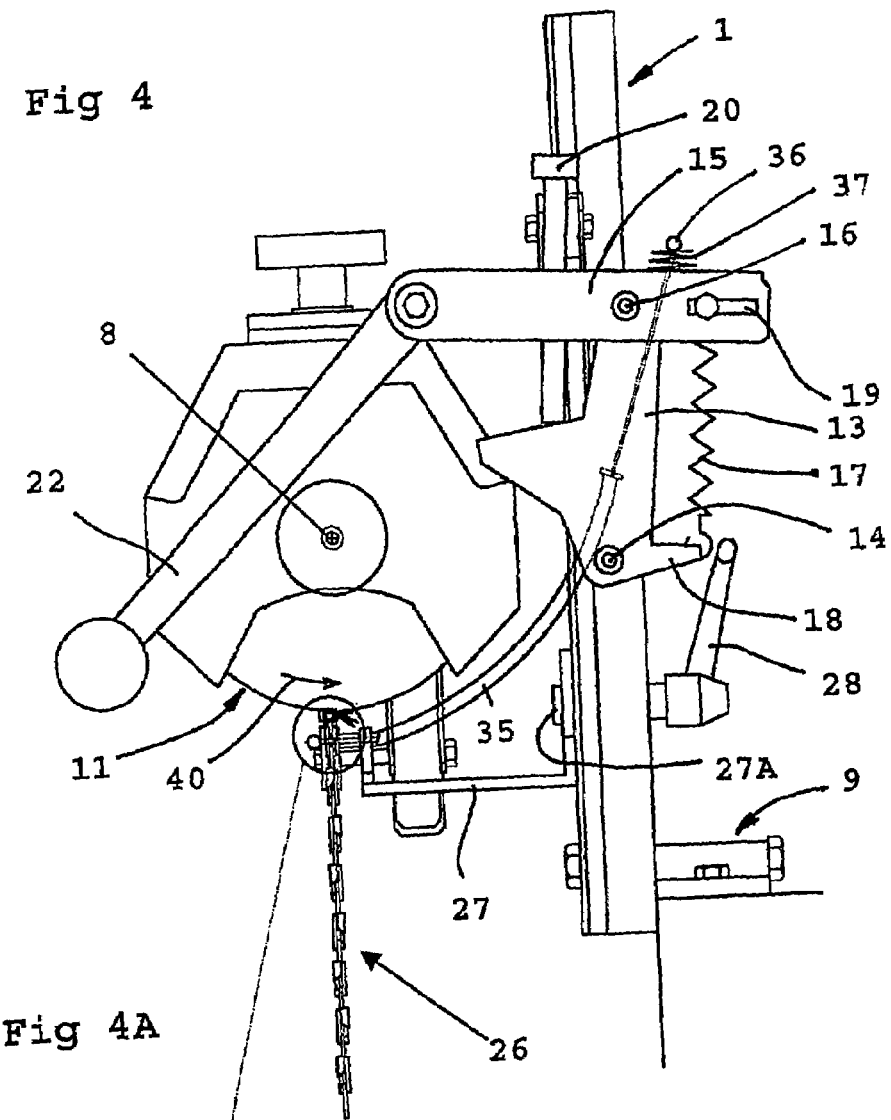
FIG. 4 shows a view of the device according to the present invention where the grinding disc is in active position.
Figure 4A:
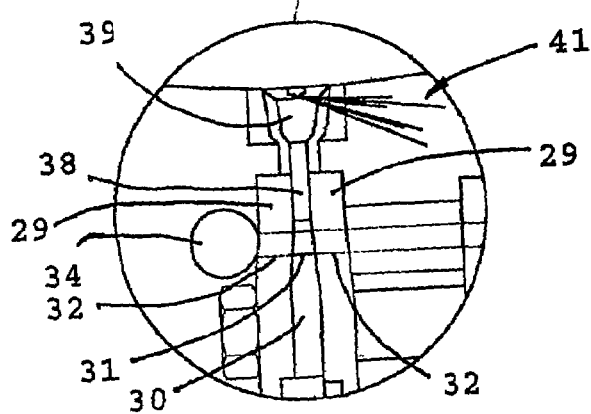
FIG. 4A shows an enlarged detail of FIG. 4.

In reality the grinding disc 11 is not located in the plane of the paper in FIGS. 1 and 4 since the cutting edge of the cutter link that is to be ground is not located in the plane of the paper. However, this is of minor importance in connection with the present invention.

Feasible Modifications of the Invention

In the embodiment described above the guide 1 constitutes a square profile, preferably of aluminium, and a number of ball bearings 7 are received in grooves 3 in the profile of aluminium. However, within the scope of the present invention it is also feasible that the guide has a different cross sectional shape although the movement of the carriage along the guide must be rectilinear.

In the embodiment described above four ball bearings 7 are used as bearing means for the carriage 5 when said carriage 5 is displaced relative to the guide 1. However, it is not absolutely necessary to use ball bearings 7 or other roller bearings as bearing means. Within the scope of the present invention other rotatable means are feasible if said means bring about a rolling contact between the carriage 5 and the guide 1. In exemplifying and non-restricting purpose rotatable wheels may be mentioned and said wheels must not necessarily be journalled by means of rolling bearings.

The invention claimed is:

1. Method for grinding a saw chain (26), comprising steps of:
    clamping said saw chain (26) in a position suitable for grinding,
    manually transferring a rotating grinding disc (11) from an inactive position to an active position, and
    effecting grinding of a cutter link (39) of the saw chain (26) when the grinding disc (11) has assumed an active position,
    wherein the transfer of the grinding disc (11) from an inactive position to an active position is effected by means of a rectilinear movement of the centre of rotation (8) of the grinding disc (11), and wherein the rectilinear movement is carried out by rolling contact between a supporting means (5) and a guide (1).

2. Method according to claim 1, wherein the clamping of the chain (26) is effected before the grinding disc (11) has assumed its active position.

3. Method according to claim 1 or 2, wherein the manual transfer of the grinding disc (11) from an inactive to an active position automatically generates a clamping of the saw chain (26).

4. Device for grinding a saw chain, said device comprising means (25) for clamping the saw chain (26) in a position suitable for grinding, a rotatable grinding disc (11) and means for manually transferring the grinding disc (11) from an inactive position to an active position, wherein grinding of a cutter link (39) of the saw chain (26) is performed, the device further comprising a guide (1), a carriage (5) displaceable along the guide (1), said carriage (5) supporting the grinding disc (11), rotatable means between the guide (1) and the carriage (5) being designed in such a way that the carriage (5) moves rectilinear along the guide (1), wherein the rotatable means (7) are provided to abut the guide (1) in order to establish a rolling contact when the carriage (5) is displaced relative to the guide (1).

5. Device according to claim 4, wherein the guide (1) is equipped with external grooves (3) on opposite sides of the guide (1), and that the rotatable means (7) are received in the grooves (3).

6. Device according to claim 5, wherein the rotatable means constitute ball bearings (7).

7. Device according to any of the claims 4-6, wherein the means for manually transferring the grinding disc (11) from an inactive position to an active position comprise a link system (13,15) that is pivotally connected to the guide (1), and a control handle (22) that is intended to be manually activated by an operator.

8. Device according to claim 7, wherein the means (25) for clamping the saw chain (26) comprise a wire (31) that is arranged in such a way that when the wire (31) is subjected to a force in a predetermined direction along the wire (31) two chain rulers (29) of the clamping means are urged towards each other thereby effecting a clamping of a drive link (38) of the saw chain (26) between the chain rulers (29).

9. Device according to claim 6, wherein the means (25) for clamping the saw chain (26) comprise a wire (31) that is arranged in such a way that when the wire (31) is subjected to a force in a predetermined direction along the wire (31) two chain rulers (29) of the clamping means are urged towards each other thereby effecting a clamping of a drive link (38) of the saw chain (26) between the chain rulers (29).

10. Device according to claim 5, wherein the means (25) for clamping the saw chain (26) comprise a wire (31) that is arranged in such a way that when the wire (31) is subjected to a force in a predetermined direction along the wire (31) two chain rulers (29) of the clamping means are urged towards each other thereby effecting a clamping of a drive link (38) of the saw chain (26) between the chain rulers (29).

11. Device according to claim 4, wherein the means (25) for clamping the saw chain (26) comprise a wire (31) that is arranged in such a way that when the wire (31) is subjected to a force in a predetermined direction along the wire (31) two chain rulers (29) of the clamping means are urged towards each other thereby effecting a clamping of a drive link (38) of the saw chain (26) between the chain rulers (29).

12. Device according to claim 11, wherein an abutment (34) is provided at an end of the wire (31) that is located adjacent to the chain rulers (29), that the wire (31) extends through the chain rulers (29), and that the wire (31) is connected to a second link (15) that is part of the means for transferring the grinding disc (11) from an inactive to an active position.

13. Device according to claim 12, wherein the wire (31) is resiliently connected to the second link (15), via a pressure spring (37).

* * * * *